United States Patent Office 2,964,083
Patented Dec. 13, 1960

2,964,083

PNEUMATIC TIRES AND TREAD STOCK COMPOSITION

Emert S. Pfau, Gilbert H. Swart and Kermit V. Weinstock, Akron, Ohio, assignors, by mesne assignments, to The General Tire & Rubber Company, Akron, Ohio, a corporation of Ohio Filed Nov. 20, 1950, Ser. No. 196,584

22 Claims. (Cl. 152—330)

The present invention relates to the manufacture of pneumatic tires of the type suitable for use on various types of motor vehicles, airplanes and the like. It particularly relates to pneumatic types having extruded tread portions of an exceedingly tough synthetic rubber.

It is an object of the present invention to provide an extruded tread for pneumatic tires which tread has improved properties combined with lower cost than those heretofore produced.

It is another object of the present invention to provide a mass of a rubber compound which does not stiffen in the coldest climates or which has clearly improved flexibility at low temperature combined with good abrasion and has other desirable physical properties.

It is a further object of the present invention to provide pneumatic tires having properties superior to those presently prepared which can be produced in volume utilizing the usual rubber machinery and which use less rubbery polymer.

Other objects will be apparent from the following description of the invention.

Only a few types or a few varieties of the many various types of synthetic rubber have been considered suitable for the manufacture of tires and in particular the treads of tires. This is because the rubber characteristics or qualities for tire treads are exacting and difficult to meet. Tire treads must be of uniform weight and cross-section; they must wear well and resist cracking both due to flexing and light; they must have substantial tensile strength and toughness. These qualities are had only in rubber compounds of the highest quality. Only highest quality rubber compounds are therefore used for good tires whereas in mechanical goods and especially in rubber footwear cost per unit of compound weight and not quality is the controlling factor.

Even though quality is of prime importance in tires, it is essential that tires be capable of being made in volume and to make tires in volume it is necessary that the rubber compounds used be capable of extrusion through an orifice (including calendering which is, in fact, extrusion through a die having rotating sides). It is only by such extrusion processes that tire treads have been made in volume and with uniformity.

Naturally, the rubber must be rendered sufficiently plastic for extrusion by apparatus of a rubber factory. Synthetic rubbers may be produced in a relatively tough state or in a relatively more plastic state as desired by simply regulating the percent of modifier. For example, a long chain mercaptan may be present in the mixture and the polymerization stopped at a point where the desired rubber is obtained. Larger amounts of mercaptan and lower degrees of conversion give more plastic synthetic rubbers with less cross-linking or gell formation.

Tough rubbers have always been broken down by long mastication or heat softening to a plastic or extrudable state before they are used in preparing tires for sale. This even though it has long been known that by an expensive and inefficient press molding operation (as distinguished from extrusion where material is forced through an orifice) a tread or at least a portion of a tread may be made without such breakdown or molecular degradation necessary for extrusion and that treads of such non-broken down rubber have a much higher abrasion resistance than those of the broken down rubbers.

The earliest synthetic rubbers were made before the discovery of the effects of mercaptan and other modifiers and were therefore so tough that they could not be processed in the ordinary factory mill without extensive plasticization. Plasticization may be and was generally accomplished by extensive mastication and/or heat softening to cause degradation or break-up of the molecules of the rubber. After this molecular degradation was had, plasticizers usually in amounts of 15 percent or less were added to the rubber to further reduce plasticity.

Inasmuch as the use of plasticizers or softeners in rubber compounds has been shown to be undesirable and to result in marked deterioration in physical properties, the use of appreciable amounts of liquid plasticizers in rubber compounds of the quality required for pneumatic tires was not even considered or if considered, was never found to be useful. This reasoning was applied even to certain mechanical goods where quality was important. In tire treads the maximum amount of softener tolerable has been about 15 percent based on the weight of the rubber and only 5 to 10 percent is usually used. Very recent work has been directed to the softening of these tougher synthetic rubbers so that they can be used in a factory. The process used is to force air into the Banbury to accelerate deterioration of the polymer. We are unaware of any advantage in the process as the polymer is so deteriorated. Work has also been done to deteriorate or breakdown latex of tough rubbers in a vain attempt to utilize the advantage inherent therein.

With the discovery of the effect of modifiers and aliphatic mercaptans which permitted the production of more plastic rubbers of the general purpose type, synthetic rubbers suitable for tires were produced directly in the plastic stage where they could be processed in the factory with little, if any, premastication. The general trend is now toward even more plastic rubbers. This trend and this procedure was adopted even though as above indicated it has long been recognized that the tough rubbers when carefully processed and brokendown to a very limited extent provided superior tire treads than the softer rubber. It was reasoned and generally believed that inasmuch as the rubber necessarily had to be plasticized or broken-down for factory processing that one might just as well start with a highly modified or soft rubber in the first instance and obtain the same end product.

We have found that the tough rubbers which were considered unprocessable and not suitable for making extruded tire treads in production may be mixed with relatively large amounts of one or more compatible oils or plasticizers to provide compounds of exceptional quality. Such compounds containing large amounts of softener have produced tire treads superior to those produced with the general purpose GR-S rubbers heretofore available and at very much reduced cost. The softener is incorporated, in accordance with the present invention, in the rubber before the rubber is deteriorated by mastication and preferably while the rubber is in a finely divided state such as is present in aqueous dispersions or in a crumblike state with small particles which may be separated by a pigment such as carbon black. Mastication in the presence of large amounts of softener added in the stages of the mastication procedure prevents the breakdown of the rubber such as is had by the usual masticating procedures. The explanation appears relatively simple when it is postulated that all plastic flow is necessarily accomplished in high polymers by sliding of molecules over each other. As the molecules increase in size and become longer chains, the attractive force or interlocking of adjacent molecules or portions of molecules may be of greater strength than the primary valence bonds between atoms in the molecule especially under the oxidizing conditions present with the result that when mastication occurs some of these primary valence bonds are ruptured and the molecules become shortened. This takes place in ordinary rubber mastication and is evidenced by the increased plasticity and by the decreased physical properties of the final vulcanizate as well as by a decrease in intrinsic viscosity.

It has been recognized that such degradation occurs, but as previously mentioned, it has been considered necessary for processability in the factory which is a controlling factor. When a compatible oily plasticizer or a compatible plasticizer, which is liquid or viscous at the mixing temperature, is incorporated into the tough rubber, it apparently enters in between the molecules to lubricate them so that they slide more easily on each other so that they are not subjected to sufficient strain to rupture the bonds or the oil prevents oxygen attack and the polymer is not broken down or deteriorated to any appreciable extent as in the case where the mastication is accomplished in the absence of sufficient plasticizer for such lubrication or protection. Appreciable degradation of molecules by mastication is apparently only had when the molecules are sufficiently large for their intermolecular forces to be greater than the bond strength between molecules under oxidative conditions. After a given rubber has been deteriorated or plasticized to such an extent that the molecules are relatively small mastication may be continued with no physical rupture of the molecules. It is, therefore, seen that degradation by mastication alone is much more severe in the high Mooney or very tough rubbers which have large molecules than in the case of the softer or lower Mooney rubbers.

Figure 1:
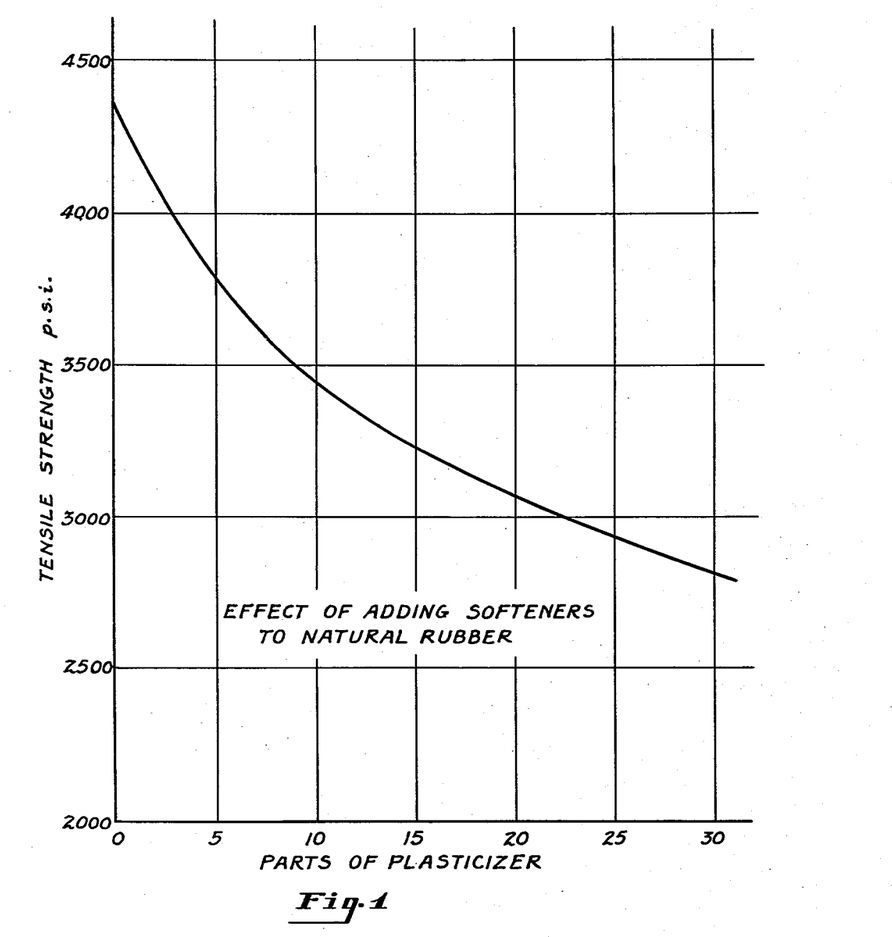
Figure 1 is a graph showing the effect of softeners on the tensile strength of natural rubber.

As aforementioned the effect of liquid or solid plasticizers in large amounts is to deteriorate the properties of the ordinary compounds made from general purpose rubbers, particularly natural rubber. This is illustrated by Figure 1 of the drawing which shows the properties of an ordinary natural rubber tread compound having varying amounts of a rubber plasticizer therein. A comparison of the properties of the vulcanizates from such rubber compounds shows that as the plasticizer is increased the properties become progressively worse.

In the case of the high Mooney or tough rubbers with which the present invention is concerned, it is found that some of the properties of a vulcanizate prepared from rubber compounds having a plasticity sufficient for processing are even improved by the addition of the oil plasticizers. Tough rubbers of which the present invention is concerned which are vulcanizates of a factory processable compound form articles such as tire treads which are improved with increasing addition of oil until a certain maximum is reached whereupon they decrease. Apparently, the deteriorating effect of the plasticizer is less than the improvement caused by the preventing of bond rupture during mastication through molecular separation or insulation until the amount of plasticizer becomes quite large. It is, therefore, seen that properties at least as good as those obtained from the standard factory processable polymers without any plasticizer whatsoever may be obtained with relatively large amounts of inexpensive plasticizer or softener providing the rubber has sufficient toughness or high Mooney plasticity.

In forming rubber compounds in accordance with the present invention it is as above indicated unnecessary and, in fact, we have found it undesirable to masticate and break down the high Mooney rubber so that it forms a compact band or plastic mass prior to the addition of the oil as was the general compounding procedure in the past.

In order to obtain maximum advantage from the tough high Mooney rubbers these rubbers should be combined with oil when in the finely divided state so that the oil can enter (be absorbed) between molecules of the rubber to facilitate slippage one on the other before they are ripped apart and broken-up by mastication. If the high Mooney rubbers are obtained in the form of a bale or large mass, they should for best results be pulverized or granulated to a powdery or crumblike state prior to contact with the oil. Such is accomplished without deteriorating the rubber. In contrast to low Mooney rubbers such as standard GR-S (Government Synthetic rubber, a general purpose butadiene-styrene copolymer), the high Mooney rubbers, when masticated in a Banbury mixer, will usually form a pulverant mass because of the lack of plasticity when they are incorporated into a Banbury mixer or the like. Frequently, however, this is not the case. In such cases pulverization of the entire material may be accomplished by adding small amounts of carbon black or other pigment with the rubber before plasticization has occurred so that the rubber particles are insulated from each other and prevented from being packed together as they are formed by the mixing apparatus. When the required amount of oil or other suitable plasticizer is added at the time the material is in a finely subdivided condition it is uniformly absorbed and best results are obtained. Addition of large proportions of oil used in the practice of the present invention to a large solid mass of rubbery polymer makes it more difficult to produce a homogeneous compound. When the rubbers are in the finely divided state, they are rapidly swelled by the oil without deterioration and the rubber particles thereafter readily agglomerate to form a plastic mass.

By utilizing our preferred procedure factory processable rubber compounds may be made in the very short time commensurate with ordinary procedures based upon the relatively highly modified and easily processable commercial synthetic rubbers. The rubber articles such as tire treads produced from the compounds having large amounts of oil are equal to and in many cases considerably superior in properties to those produced from conventional mixes.

When the rubber is available in the form of a latex, the oil is preferably first emulsified and incorporated in the latex in the emulsified form and the mixture suitably coagulated. Preferably a so-called shock method of coagulation is used wherein the coagulable latex-oil emulsion mixture is passed into a large mass of coagulating medium such as salt and acid. Even unemulsified oil may also be incorporated into the wet coagulum or crumb even in the presence of free drainable water and it is found it will be selectively absorbed even in the presence of such water.

In the compounding of the synthetic rubber-oil mixtures the total quantity of oil plus synthetic rubber is considered to be rubber. By this method compounds formed in accordance with the present invention generally have hardness and physical characteristics similar to normal compounds made from commercial easy processing synthetic rubbers. To illustrate this, a good tread compound having 100 parts of rubber and 50 parts of carbon black generally gives properties which are desirable. Using tough rubber-oil combinations with 100 parts of rubber and 100 parts of oil, we would utilize 100 parts of the carbon black for about equal hardness and comparable properties.

Proper characterization of a given polymeric material may not always be made directly by means of a Mooney plastometer reading on the raw polymer, as gel content, gel distribution, and molecular weight affect the polymer and are not indicated by a Mooney plastometer. When a polymer is exceptionally tough so that it would have a Mooney reading about 120, slippage between the rotor and polymer frequently occurs with the result that the Mooney reading may be in error and not reliable.

Furthermore, when the tough particles are distributed within softer particles of a rubbery polymer or when a non-homogeneous or a gel containing polymer is had, the Mooney plasticity reading frequently fails to characterize the polymer. Thus, while a Mooney plastometer is satisfactory in distinguishing between rubbers having no gel but of varying molecular weights until the Mooney reading is about 120 (where slippage or tearing may occur), it fails to distinguish between such rubbers and rubbers having substantial gel content. Gel containing rubbers require substantially increased amounts of plasticizer.

Reference should be had to the accompanying drawings in which.

Figure 2:
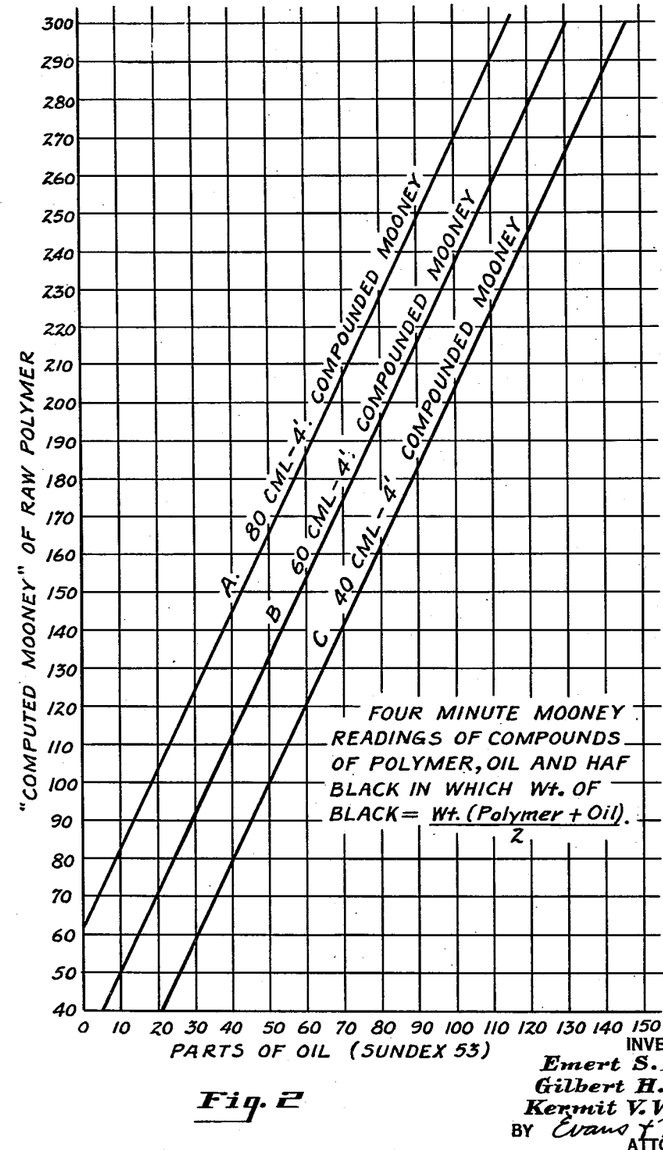
Fig. 2 is a graph in which the plasticities of various raw polymers are plotted against the amount of oil in compounds of the same polymer containing oil and carbon black in an amount equal to one half the combined weight of the polymer and oil to provide compounds having plasticities of 40, 60 and 80 measured as indicated on a Mooney plastometer.

We have found that in any given polymer modified so as to have substantially no gel, the amount of oil required to obtain a compound of a given plasticity varies directly with its Mooney plasticity and directly with its intrinsic viscosity. Thus, there is a substantially straight line relationship between the amount of a given oily plasticizer required to obtain a given compounded Mooney and the raw Mooney reading when plotted as illustrated in Fig. 2 providing a given carbon black such as a fine reinforcing furnace black for example "Philblack O" (a structural type of fine high abrasion furnace black of the Phillips Petroleum Company) is utilized and the amount of the carbon black is equal to a given percentage of the total weight of rubber plus oily plasticizer say .50 percent of the total of these two materials. We have also found that the compounded Mooney of a given polymer varies in approximately a straight line relationship with the amount of a given oily plasticizer contained therein. If therefore, the polymers are of a non-gel type, and vary only by molecular weight as indicated by intrinsic viscosity measurements, then the curves obtained by plotting parts of oil necessary to obtain a given compounded Mooney (CML–4') versus measured raw Mooney of the polymer are approximately parallel lines especially when the accuracy of duplication and measurement is considered. We have made use of this fact as hereinafter further explained to develop the term "computed Mooney" which applies to all synthetic rubbery polymeric materials, regardless of how they are obtained. The "computed Mooney" of a gel containing polymer is the true Mooney of an equivalent gel free polymer. In Figure 2 calculated or "computed Mooney" is plotted versus parts of oil (Sundex 53) required in the various gel free polymers to obtain compounded Mooney values of approximately 40, 60 and 80 as shown by lines A, B, and C respectively with a short mixing cycle of not more than 12 minutes as hereinafter described. The computed Mooney and the measured raw Mooney are the same within accuracy of measurement at the lower values, i.e., below 120 for these gel free polymers.

In order to properly prepare tires and particularly extruded treads of tires, the compounded Mooney of the compounds used should generally lie between 40 and 80. When the rubber compound is too plastic (too low a Mooney, for example much below 40) difficulty is had in holding shapes and when the compound is not sufficiently plastic, i.e., has over 80 Mooney, great difficulty is had in overheating and scorching in the extruding operation as is had in a calender tuber or the like necessary for forming extruded tire treads of uniform section. It is preferred that the compounded Mooney of the rubber compound be within the range of 50 to 70. Line B, the curve for compounded Mooney values of 60 is therefore squarely in the center of the range preferred for factory processing. The slope of this line was obtained by plotting the measured raw Mooney reading of gel free polymers against the amount of oil required to obtain a compound with a 60 CML–4' (compounded Mooney of 60 measured with the large rotor at four minutes). Slopes and positions for 40 CML–4', and 80 CML–4' lines were obtained in the same manner except that the compounds were made to 40, and 80 compounded Mooney respectively. One may find "computed Mooney" of a given polymer utilizing the graphs of Figure 2 by preparing a rubber carbon black mixture with a given amount of oil utilizing the mixing procedure described below and measuring the Mooney of the compound in the ordinary manner using the large rotor of a standard Mooney plastometer and reading the value at four minutes.

If the measured four minute compounded Mooney (CML–4') of the compound falls in the neighborhood between 40 to 80 i.e. near any of lines A, B, and C the "computed Mooney" may be simply read from the scale designated "computed Mooney" using standard interpolation or extrapolation procedures. If the measured compounded Mooney is substantially removed from the range of 40 to 80 another compound with greater or less oil may be prepared showing a compounded Mooney closer to this range and the amount of oil and actual Mooney level may thereupon be read by interpolation procedures.

As above explained, sample compositions made for the purpose of computing the Mooney viscosity of a polymer have a fine reinforcing-furnace carbon black (a high abrasion furnace black) content equal to one-half the combined polymer and oil content. As shown in Fig. 2, a sample having 30 parts by weight of oil to 100 parts by weight of polymer and a measured Mooney plasticity of 60, would have 65 parts by weight of said carbon black and the computed Mooney plasticity of the polymer would be approximately 90. It will be apparent that the polymer of any sample having 30 parts of oil and 65 parts of said carbon black and a measured Mooney plasticity greater than 60 will have a computed Mooney plasticity above 90. Conversely, a sample with 30 parts of oil and 65 parts of said furnace carbon black to 100 parts of a polymer of above 90 computed Mooney plasticity, will have a measured Mooney plasticity greater than 60. As will be seen from the graph in Fig. 2, a similar relationship holds true for samples requiring various oil contents to bring them to a workable plasticity. For example, a sample composed of 100 parts of a polymer, 40 parts of oil and 70 parts of said carbon black that has a measured Mooney plasticity of 60, has a computed Mooney plasticity of approximately 110, a sample composed of 100 parts of a polymer, 50 parts of oil and 75 parts of said furnace carbon black that has measured Mooney of 60, has a computed Mooney plasticity of about 130; and a sample composed of 60 parts of oil and 80 parts of said furnace carbon black that has measured Mooney of 60 has a computed Mooney of about 150.

The mixing procedure used for evaluating a polymer may, of course, affect the plasticity of the compounds obtained with a given amount of oil or softener. Longer mixing times, particularly in the presence of insufficient softener will considerably deteriorate the polymer and result in lower Mooney. Even in the presence of substantial amounts of softener the substantially increased mixing times have slightly adverse effects on the polymer. If, therefore, in preparing a factory batch insufficient oil has been added to provide the processability necessary for the factory operations, increased processability may be had by remixing the material without any additional oil.

In preparing rubber compounds for evaluation the tough rubber is incorporated in a warm laboratory Banbury mixer (approximately 200° F.) worked for about one minute whereupon the tough rubber tends to break into fine crumbs which will not work into a cohesive mass in the Banbury. The oil is added in one or two increments depending on the amount of softener used and worked for four to six minutes. The oil should preferably be absorbed in the rubber before any carbon black is added, but the black can be added before the oil is completely absorbed if desired. When the polymer fails to break-up into a fine crumb in the Banbury a small amount of the black may be added initially to insure the formation of a fine crumb. The carbon black is added in several increments and worked four or five minutes until a fairly cohesive mass is obtained. Cold water is preferably circulated through the Banbury during the carbon black addition in order to prevent excessive temperature rise. The total mixing time should be only that required to obtain a cohesive mass. The mix should immediately be placed in a cold tight laboratory mill (6" x 12" rolls) and milled for two minutes at .050 separation of rolls allowed to cool one-half hour and the compounded Mooney determined. When the rubber compound is to be used for the production of rubber articles the usual compounding ingredients may be added on a second pass through the Banbury mixer requiring about two to four minutes for the addition of the materials.

We have found that for any given "computed Mooney" reading or for any given actual measured Mooney in a given type of polymer there is a minimum amount of oil which is required for satisfactory processing without long and uneconomical mastication cycles and mixes. When the rubber into which the oil or other plasticizer is incorporated has a computed Mooney of 90 about 30 parts of oil or other liquid softener is usually required for each 100 parts of rubber to obtain a 60 Mooney compound (60 CML–4') and 20 parts of oil are required to obtain a 70 CML–4' which is on the less plastic side of the more desirable factory processibility range. Where the benefits of the present invention become more impressive i.e. at "computed Mooneys" above 115, at least 30 parts of oil are usually required to obtain a factory processable 70 Mooney compound and about 40 parts for a 60 Mooney compound using the 50 parts of black per 100 parts of rubber. When the "computed Mooney" plasticity (if the compound is gel free and prepared at low temperature) or when the measured Mooney is about 120, at least 35 parts and preferably about 40 parts of oil is desirable in order to provide the desired factory processibility. When the "computed Mooney" plasticity of the rubber is 150 or above, at least 45 to 50 parts of the oil are required to obtain the same processibility, and as much as 75 parts by weight of oil may be present per 100 parts by weight of a synthetic rubber without giving tire treads having inferior properties to those made from standard GR–S as presently manufactured. Even more oil, say 100 parts may be used when the black or pigment content is increased above the 50 percent of oil plus black which loading we have found to be exceedingly satisfactory. When the Mooney plasticity reads about 150, 50 to 75 parts of oil are generally most desirable for high quality tire treads. As much as 200 or even 250 parts of oil or other plasticizer may be used in some compounds with 100 parts of the toughest rubbers to obtain products of surprising value combined with low cost.

It has been our experience that synthetic rubbers having a computed Mooney of appreciably over 70 cause great difficulty in factory handling and have been considered undesirable for factory use without premastication or deterioration treatments. When the computed Mooney is 80 or above, factory handling according to prior methods has been substantially impossible. The maximum benefits of the present invention are obtained with synthetic rubbers having computed Mooneys much above those which are considered useable in factory production although substantial benefits of the present process are obtained when the computed raw Mooney of the synthetic rubber used is as low as 85.

Greater benefits are obtained in accordance with the present invention when the computed Mooney of the raw polymer is 100 or more as the amount of oil used to obtain substantially the same properties is considerably increased without disadvantage and greater economies are effected. The low temperature properties of the rubber compound when the preferred low temperature plasticizers are used are improved with increased plasticizer content. The major benefits of the present invention are obtained when the Mooney plasticity is more than 115 or the measured Mooney of a gel free polymer is more than 115, all Mooney being measured with a large rotor at four minutes in accordance with standard procedures.

We preferably prepare polymers with Mooney plasticity of 150 or more in order to use large volumes of inexpensive oil and obtain the tread wear inherent in these unbroken-down polymers. It is as aforementioned, preferred that these very high Mooney rubbers are polymers prepared by low temperature polymerization processes utilizing a highly accelerated system.

The rubber should preferably be homogeneous or if present in mixture with other rubbers such as those of the general purpose type, should constitute a major portion or sufficient proportion such that the computed raw Mooney reading of the mixture is at least 85.

The intermolecular forces of the higher Mooney rubbers with which the present invention is concerned must be greater than the intermolecular forces of the lower Mooney rubbers since attraction of plasticizer would seem to be the same in each instance. So it is readily seen that the compatible plasticizer should be somewhat more readily absorbed by lower Mooney than by higher Mooney synthetic rubbers.

The soft rubbers with large amounts of plasticizer may in turn plasticize the tough rubbers when the "computed Mooney" of an uncompounded mixture, i.e. four minute Mooney reading, without the softener is much less than 85. The preparation of the softer rubber diluted with sufficient softener to become a composite plasticizer may become too great to be effectively disposed between tough polymers and a heterogeneous compound may result. It is apparent for this reason that any artificially created mixture of separately produced high and low Mooney rubbers should have a minimum computed Mooney of 85 to obtain advantages of the present invention. More benefits are of course obtained when the computed Mooney of the mixed polymer is well above 90 or 100 such as for example 115 or above.

In preparing mixtures of high Mooney with low Mooney polymers the two materials should be of about the same plasticity when mixed in order to insure a homogeneous mixture. The high Mooney rubber is preferably mixed with the required amount of oil and plasticizer as aforementioned before it is combined with a lower Mooney polymer. Preferably, both polymers are mixed with the required amount of carbon black prior to combining them. However, reasonably good results are obtained when carbon black masterbatches of the lower Mooney polymer are incorporated with the high Mooney polymer prior to admixing the latter with the oil or plasticizer. The carbon black stiffens the lower Mooney materials particularly when the masterbatch is formed via the latex route and the lower Mooney polymer is unmasticated so that it may have substantially the same plasticity as the high Mooney polymer. It is emphasized, however, that the advantages of the present invention are reduced as the proportion of the high Mooney rubber in a mixture is reduced.

The synthetic rubbers to which the present invention relates are polymers of conjugated diolefinic compounds such as butadiene, isoprene, dimethylbutadiene etc. having not in excess of and preferably less than eight carbon atoms. Copolymers of one or more diolefinic compounds such as those aforementioned with one or more copolymerizable mono-olefins such as the arylolefinic compounds such as alpha-methylstyrene, 3,4-dichloro-alpha-methylstyrene, p-acetyl-alpha-methylstyrene, and including the arylvinyl compounds such as styrene and halogenated and nuclearly methylated styrenes such as 2,5 or 3,4-dichlorostyrene, 3,4-dimethylstyrene, 3-chloro-4-methylstyrene and unsaturated polymerizable ketones such as methylisopropenylketone, and methylvinylketone.

In the copolymers the total proportion of butadiene and/or other conjugated diolefinic compounds is ordinarily at least 50 percent of the weight of the copolymer. However, we have been able to prepare a very desirable rubbery material by adding oil thereto with as much as 85 percent of monoolefinic compounds such as styrene and 15 percent of butadiene or total conjugated diolefinic compound. Such materials are not suitable for tire treads but are the subject matter of related applications intended to be filed shortly.

The plasticizer should be compatible with the synthetic rubber and any compatible plasticizer even solid or semi solid plasticizers may be used. However, liquid or oily plasticizers are generally considerably superior and liquid plasticizers with a low pour point are ordinarily much superior for low temperature rubbers. In the case of synthetic rubbers made from butadiene or a conjugated diolefin and styrene and in other hydrocarbon rubbers generally, including polybutadiene and polyisoprene, the plasticizer is preferably a mineral oil having a boiling point well above temperatures to be encountered in use. For ordinary usage the plasticizer should not boil below 450° F. and preferably should not boil below 550 or 600° F. Of these, those mineral oils having a low aniline point or high aromatic content are much preferred. especially when the rubber contains styrene or has appreciable amounts of aromatic components.

The particular plasticizer is often selected because of the use for which the rubber article is intended. In the case of tires intended for arctic use, we have found that rubber treads having exceedingly desirable low temperature flexibility may be made by utilizing oils both hydrocarbon oils of low pour point and others such as ethers that are compatible as the softener. This even though the boiling point may be much lower than the 450° F. most desirable for high temperature use. Most high boiling esters are not sufficiently compatible with the high Mooney general purpose synthetic rubbers such as polybutadiene and copolymers of butadiene with styrene and/or methyl isopropenyl ketone to be used alone in the large amounts required. They may be used in admixture with a compatible plasticizer. Ester plasticizers are not as desirable and do not give the desirable properties in hydrocarbon rubber compounds that were obtained by the inexpensive mineral oils although some of the benefits are obtained. Even when the rubber is entirely hydrocarbon as in the case of GR-S and polymers of diolefinic compounds such as polybutadiene or polyisoprene rubbers, some of the benefits of the present invention are obtained by the use of other plasticizing agents such as cumar resins, cumarone-indene and various mineral rubbers and the like. These may be substituted for a part of the oily softeners aforementioned to obtain special properties. While mineral oils are preferred as the oily plasticizer and give compounds with exceptional properties, other oily materials such as coal tar oils and the like may also be used for part or all of the plasticizer. What is believed to be the best arctic or low temperature rubbery compound yet produced is obtained by the present invention utilizing a substituted phenol (such as Cardolite, which is a lower alkyl ether of an alkylated phenol having about 15 carbon atoms in the aliphatic side chain usually having the formula —$C_{15}H_{(27-31)}$ and the lower alkyl group attached to the oxygen generally has no more than 4 carbon atoms) as the plasticizer in a rubbery polymer of a butadiene or in a hydrocarbon copolymer of a diolefin and a hydrocarbon mono-olefin such as styrene containing at least 50 percent of the conjugated diolefin such as butadiene. The plasticizers listed below in Table 2 have been used in the practices of the present invention. The hydrocarbon plasticizers, and phenols substituted by unsaturated aliphatic compounds are preferred for hydrocarbon polymers or hydrocarbon synthetic rubbers. The various plasticizers or oils are not therefore equivalent but we have found them useful in obtaining various desirable specific properties in the compounds formed from the high Mooney rubbers. The following are examples of the various types of plasticizers showing identifying data, trade names, manufacturers or suppliers and relative "heat loss" after exposing the oil for the time indicated at 300° F.

TABLE 1

| Oil | Manufacturer | Pour Point | Flash Point | Aniline Point | Boiling Range | Heat Loss at 300° F. | |
|---|---|---|---|---|---|---|---|
| | | | | | | 1 hr. | 3 hrs. |
| Sundex 53 (A dark aromatic and naphthenic blend lubricating oil extract consisting of 76% aromatic hydrocarbons and 26% naphthenic hydrocarbons. It has Saybolt viscosity at 210° F. of 90 seconds, a specific gravity of .97. Some of the hydrocarbons have aliphatic unsaturation). | Sun Oil Co | 70° F | 380° F | 130° F | | 3 | 6 |
| Dutrex 6 (A complex high mol. wt. aromatic and unsaturated hydrocarbon petroleum oil having no volatiles or asphaltic residue and having a specific gravity of 1.02 and a Saybolt viscosity at 212° F. of 142). | Shell Development | | | | +600° F | 1 | 2 |
| Dutrex 7 (A hydrocarbon plasticizer of heavy process oil type derived from petroleum and having a specific gravity of 1.0 and a Saybolt Universal viscosity of 142 at 212° F.) | do | | 440° F | | | 1 | 2 |
| Circosol 2X (A light green viscous hydrocarbon liquid having the specific gravity of .94, Saybolt viscosity at 100° F. of about 200 seconds and at 210° F. of about 85 seconds. It is a naphthenic type hydrocarbon containing some aromatic oil. It is predominantly naphthenic). | Sun Oil Co | +10° F | 430° F | 181° F | +700° F | 1 | 3 |
| Califlux GP (Blend of unsaturated components of naphthenic base petroleum. It has a specific gravity of 1.01 and a Saybolt viscosity at 210° F. of 110 seconds). | Golden Bear Oil Co | 45° F | | 34° C¹ | +665° F | 4 | 12 |

See footnote at end of table.

TABLE 1—Continued

| Oil | Manufacturer | Pour Point | Flash Point | Aniline Point | Boiling Range | Heat Loss at 300° F. 1 hr. | Heat Loss at 300° F. 3 hrs. |
|---|---|---|---|---|---|---|---|
| Sovaloid N (Dark brown mineral oil containing about 80% of aromatic hydrocarbons and containing some naphthenic hydrocarbons. It has a specific gravity of 1.03, a Saybolt Universal viscosity of 44 at 210° F.). | Socony Vacuum | Below 0° F | 350° F | 115 [1] | +600° F | 14 | 31 |
| Sovaloid C (Synthetically produced entirely aromatic hydrocarbon petroleum oil having a specific gravity of 1.06, a Saybolt Universal viscosity at 110° of 36). | do | 10° F | 330° F | 66 [1] | +580° F | 2 | 3 |
| Cardolite 625 (Cardanol stated to be the monophenolic component of commercial cashew nut shell oil. Cardolite 625 is ethyl ether of Cardanol. Some unsaturation in side chain).  | Irvington Paint & Varnish Co | | | | | 6 | 14 |
| Hercoflex (Octyl-decyl phthalate) | | | | | | 1 | 2 |
| Dioctyl phthalate | | | | | | 2 | 6 |
| QXS158B (Naphthenic light distillate) | Imperial Oil Co | | | | | 14 | 29 |
| QXS158D (Refined naphthenic light distillate) | do | | 325 | 162 | | 1 | 2 |
| QXS158E (Refined naphthenic heavy distillate) | do | | 345 | 172 | | 9 | 28 |
| QXS158F (Highly refined naphthenic light distillate). | do | | 470 | 207 | | 1 | 1 |
| QXS158G (Highly refined naphthenic heavy distillate). | do | | 345 | 207 | | 7 | 17 |
| QXS158H (Asphaltic plasticizer (Processed cracked tar)). | do | | 490 | 276 | | 16 | 33 |
| Liquid Poly R.D. (Low molecular weight polybutadiene). | Phillips Petroleum Co | | 315 | | | 7 | 10 |
| ASTM #1 (ASTM Standard Oil) | | | 470° F | 124° C | | 1 | 2 |
| ASTM #2 (ASTM Standard Oil) | | | 475° F | 93° C | | 1 | 3 |
| ASTM #3 (ASTM Standard Oil) | | | 350° F | 70° C | | 15 | 26 |
| TP90B (High molecular weight liquid oily polyether). | Thiokol Corporation | | | | | 4 | 34 |
| Harflex 500 (Phenyl oleate) | Binney & Smith | | | | | 4 | 9 |
| Flexol 8N8 (C₇H₁₅COO—C₂H₄)₂NCOC₇H₁₅). | Carbon & Carbide Co | | | | | 4 | 10 |
| Circle Light Oil (More volatile than Circosol 2XH and more aromatic hydrocarbons. It is a petroleum distillate obtained after the cracking process). | Sun Oil Company | Below 0° F | 325° F | 157° F | | 12 | 30 |
| Neville Heavy Oil (Aromatic hydrocarbons largely derived from thermal decomposition of coal or oil). | Neville Company | | | 28.2 [1] | | | |
| Diamond Process Oil (Low pour point oil largely paraffinic. It is a petroleum distillate obtained after the cracking process has a specific gravity of .883, a flash point of 360, a viscosity at 100° F. of 100, and at 210° F. of 39, an aniline point of 1.79, and a pour point of 15 to 20° F.). | Standard Oil Company | | | | | | |
| Resinex 14 (Polymerized aromatic resins from cracked petroleum oils. Coumarone-indene). | Hawick Standard Chemicals | | | | | | |
| Cardolite 7625 (Ethyl ether of vacuum distilled Cardanol. It has two aliphatic double bonds per mol (625 has 0.8 double bond per mol)). | Irvington Paint & Varnish Company. | | | | | 3 | 11 |
| Cardolite 6583 (Benzyl ether of Cardanol. Same as Cardanol #625 except the benzyl group is substituted for the ethyl group). | do | | | | | 5 | 9 |

[1] Mixed aniline point.

The polymers having a high "computed or calculated Mooney" as aforedescribed may be prepared by any of the polymerization processes including emulsion and mass free radical polymerization processes and also by the ionic polymerization process including both the alfin catalyst process and the Friedel-Crafts catalyst process. When the rubbers are prepared in emulsion, those synthetic rubbers produced with a redox type system at temperatures substantially below 60° F. we have found produce articles which have superior properties. These so-called cold rubbers particularly when they are made below 50° F. in the presence of some very minor amounts of a modifier are generally substantially gel free or have longer chains in proportion to the number of cross-links than have the higher temperature polymers. They, therefore, apparently have much longer molecular chains. In connection with the so-called alfin process wherein the polymerization is conducted with the alfin catalyst as described in Rubber Age, volume 65, page 58, 1949, in the presence of a solvent or diluent the oily plasticizer, particularly if it is a mineral oil may be substituted for all or part of the diluent or solvent. The alfin rubbers have heretofore been considered undesirable because of their high molecular weight characteristics and the tremendous difficulty involved in breaking them down by milling procedures so that they could be formed into factory processable compounds. As described in the above cited article in Rubber Age, which is an abstract of an article entitled "Butadiene Polymers and Polyisobutylene" which appears in Industrial and Engineering Chemistry, January 1950, pages 95 to 102. As there set forth, one of the alfin catalysts is a complex of the sodium compounds of alcohol and an olefin. For example, sodium propoxide-allyl sodium. The catalysts are generally sodium alkyls complexed with an ether and/or alcohol as described in the above article. The polymerization takes place in mass and proceeds at a satisfactory rate at room temperature or mass.

In accordance with the present invention alfin rubbers may be produced directly in readily useable state or they may be produced in the same way as previously and the oil or plasticizer added in a Banbury as above-described.

Any of the various carbon blacks may be incorporated in accordance with the present invention either in the latex or during the mastication procedures. The amount of carbon black for a tread compound is, if the plasticizers plus the synthetic rubber are considered all as rubber, substantially identical to that used in the standard methods where the carbon black is based only on the rubber present if compounds of similar hardness are to be had. While any of the carbon blacks including the furnace blacks, channel black, and even thermatomic may be used to obtain compounds suitable for many purposes, the fine reinforcing furnace blacks, particularly those having some structure such as the aforementioned "Philblack O" produce tire treads having outstanding properties and are therefore preferred and the compounds prepared from these fine reinforcing carbon blacks or HAF (high abrasion furnace blacks) have properties which are superior to others. The amount of carbon black and or other pigment such as zinc oxide, titanium dioxide, "Hysil" (silicon dioxide pigment) and the like may vary very widely. Compounds or rubber mixtures without carbon black or with small amounts of carbon black and other pigments are suitable for many purposes including carcass compounds. Compounds with as much as 75 or 80 parts of carbon black based on 100 parts of the total of rubber plus oil are often suitable for higher abrasion compounds.

In tire treads however, the amount of carbon black used is preferably about 30 or 35 percent to 60 or even 65 percent based on the total amount of oil or plasticizer plus rubber present in the compound. Part of the carbon black may be substituted however by other pigments on the basis of equivalent surface area. Lignin incorporated into the latex as an alkaline solution and copreciated therewith may be used in amounts commensurate with the pigment content of the carbon black.

The present invention is as aforementioned especially suitable for the production of rubber compounds that exhibit high flexibility at low temperatures such as may be encountered in far northern climates. While any of the polymers may be used in making rubber compounds the hydrocarbon synthetic rubbers are generally preferred in tires and of the hydrocarbon rubber compounds those prepared substantially entirely from a diolefin such as butadiene are preferred particularly when the polymerization as aforementioned takes place at a temperature well below 50° C. and preferably not in excess of 60° F. superior results being obtained as the polymerization temperature is lowered.

The synthetic rubbers consisting essentially of polymerized butadiene and/or polymerized isoprene are the preferred polymers for preparing general purpose compounds suitable for arctic purposes and may be used with any plasticizers compatible therewith. The lower the pour point of the plasticizer the lower is the temperature at which the rubber has flexibility.

The effect of oil or plasticizer incorporated before breakdown in preventing the deterioration of the rubber is illustrated by the following:

*Example 1*

Three polymers having "computed Mooney" values in the raw state of 205, 120 and 55 were prepared. These compounds were prepared according to the standard cold rubber polymerization recipes from a mixture comprising 72 parts of butadiene and 28 parts of styrene. The 55 computed Mooney material was the standard cold rubber GR–S. The polymers were divided into four batches, A, B, C and D respectively, for four different compounding procedures.

Batch A was treated in accordance with the standard compounding procedure used prior to the present invention. The raw polymer was masticated on a cold tight laboratory mill which differs from a factory mill in that the rolls can be set almost adjacent each other and therefore there is a much greater plasticizing action. Each of the tough high Mooney polymers were alternately placed on a cold mill for one-half hour then cooled for one-half hour, again milled for one-half hour, etc. until they were broken down sufficiently to produce a compounded Mooney suitable for factory processing. The mill rolls were set 0.001" apart. The 205 computed Mooney required 2100 complete passes through the mill and about twenty-four hours milling to obtain sufficient plasticity for a compound made with 50 parts of "Philblack O" for each 100 parts of rubber to have a four minute Mooney reading of 62. The 120 compounded Mooney also required 2200 complete passes through the mill in order that the compound have a Mooney reading of 65. The standard cold rubber was milled for about two hours to produce a compounded Mooney of 87 which while it was too high for factory processing, could be used for molding tensile strips, etc., in the laboratory. Into each of the thus broken down polymers was incorporated therein 50 parts of Philblack O, 1 part "B.L.E." (A high temperature reaction product of diphenol amine and acetone) 3 parts zinc oxide, 1 part stearic acid, 0.9 part of accelerator "Santocure" (N-cyclo hexyl-2-benzothiazole sulfenamide) and 1.25 parts of sulfur for each 100 parts of the respective polymers. The thus compounded rubbers were cured into standard test slabs and tested according to standard procedure. 15, 30, 45, 60 and 75 minute cures were made of each of the above compounds. A batch B of each of the polymers was made in the identical manner except that the amount of sulphur was increased to 1.75 parts and the amount of carbon black was increased to 75 parts.

Batch C of each of the polymers was also made from the broken-down polymer in identical manner with batches A and B except that 85 parts of "Philblack O," 70 parts of "Sundex 53" (a dark aromatic and naphthenic hydrocarbon lubricating oil extract as previously described), 2.25 parts of sulfur, 0.9 part of stearic acid, 1 part each of B.L.E. and Santocure were used in preparing the compound.

Batch D was compounded in accordance with the present invention. In this batch each of the polymers were separately placed in a Banbury mixer and mixed with oil and "Philblack O" in accordance with the procedures above set forth for evaluating polymers. The polymer having a computed Mooney of 205 was mixed with 85 parts of black and 70 parts of oil. The polymer having a Mooney of 120 was mixed with 75 parts of black and 40 parts of oil and the cold rubber 55 Mooney polymer was mixed with 50 parts of black and 5 parts of oil.

Inasmuch as both the tensile strength as the elongation are important characteristics of a rubber compound it has been considered by many authorities that the proper characterization of a rubber compound is based on "tensile product" which is the product of the tensile strength times the elongation. Inasmuch as it is obviously only the polymer and the 50 parts of black which are necessary for its optimum reinforcement (as developed from many years use of synthetic rubber and tire treads) and to provide rubbery properties in the compound, the oil and carbon black are considered merely extenders. Therefore, in determining the true tensile product of the compound only the polymer content and 50 parts of the black are considered as providing the entire properties. This tensile product is indicated in Table 2 both for the compound as extended and on the basis of the amount of polymer reinforced with 50 parts of black. Thus, to illustrate when the black loading is 85 and the oil loading is 70 and the amount of additional compounding ingredients is 5, it is seen that there are 260 parts of material in the particular rubber compound. Only 155 parts are present in an optimumly reinforced polymer containing 50 parts of black. Therefore, if the tensile product (tensile times elongation) at optimum cure is 100 for the highly extended compound the tensile product based upon the rubber (polymer), plus 50 parts of black present is, in fact, $$100 \times \frac{260}{155}$$

It will be seen from Table 2 that the tensile product of articles made from factory processable compounds with large amounts of oil without the excessive breakdown of the rubber, is greatly enhanced. These data show that when amounts of oil, in accordance with the present invention, are present during the mixing process, particularly when the polymer is in the finely divided state, the properties of the polymer are not deteriorated and the inherent characteristics of the high Mooney polymers are maintained.

The compounds were masticated or mixed in accordance with the aforementioned recommended procedure for evaluating polymers and cured into standard test slabs. The slabs having optimum cure were tested as to their low temperature properties in accordance with the procedure recommended by the article by S. D. Gehman, et al., Ind. & Eng. Chem. 39, 1108–1115 (1947) for Gehman values. There is also shown in the following table a GR-S compound containing 5 parts of Paraflux softener which is generally recognized as a standard tread compound. The larger the Gehman value at the temperature indicated the better is the low temperature property of the compound. It will be seen that compounds may be prepared in accordance with the present invention with flexibility at temperatures of −75° F. By incorporating even larger amounts of oils such as Diamond Process Oil, Cardolite, high boiling esters and

TABLE 2

| Batch | Computed Mooney[1] of Polymer | Tensile Strength, p.s.i. | | | | | Elongation, Percent | | | | | Optimum Cure, minutes | Tensile Prod. (Tensile× Elong. of Opt. Cure) (In Thousands) | Tensile Prod. at (100 R 50 Blk.) In Thousands) | Compound Mooney[1] |
|---|---|---|---|---|---|---|---|---|---|---|---|---|---|---|---|
| | | 15' Cure | 30' Cure | 45' Cure | 60' Cure | 75' Cure | 15' Cure | 30' Cure | 45' Cure | 60' Cure | 75' Cure | | | | |
| A | 205 | 2,120 | 3,750 | 3,700 | 3,880 | 3,900 | 710 | 580 | 525 | 460 | 445 | 30 | 2,178 | 2,178 | 62 |
| A | 120 | 1,480 | 3,400 | 3,760 | 3,420 | 3,660 | 750 | 600 | 530 | 450 | 470 | 30 | 2,040 | 2,040 | 65 |
| A | 55 | 113 | 1,560 | 2,980 | 3,420 | 3,380 | 750 | 625 | 535 | 550 | 450 | 60 | 1,880 | 1,880 | 87 |
| B | 205 | 2,580 | 3,500 | 3,640 | 3,640 | 3,900 | 405 | 310 | 300 | 255 | 270 | 45 | 1,093 | 1,260 | 134 |
| B | 120 | 3,900 | 3,620 | 3,660 | 3,600 | 3,560 | 390 | 345 | 300 | 300 | 270 | 30 | 1,250 | 1,450 | 119 |
| B | 55 | 2,560 | 2,960 | 3,310 | 3,360 | 3,220 | 430 | 345 | 280 | 215 | 250 | 45 | 935 | 1,090 | 139 |
| C | 205 | 950 | 1,600 | 2,040 | 2,060 | 2,020 | 720 | 580 | 490 | 465 | 465 | 45 | 1,000 | 1,680 | 17 |
| C | 120 | 1,110 | 2,240 | 2,330 | 2,420 | 2,520 | 605 | 545 | 455 | 450 | 435 | 45 | 1,073 | 1,805 | 29 |
| C | 55 | 238 | 1,570 | 2,130 | 2,220 | 2,560 | 740 | 650 | 430 | 435 | 450 | 45 | 936 | 1,570 | 36 |
| D | 205 | 1,050 | 2,775 | 3,030 | 3,000 | 3,120 | 1,140 | 765 | 645 | 635 | 625 | 45 | 1,955 | 3,270 | 65 |
| D | 120 | 1,230 | 3,100 | 2,920 | 3,060 | 3,060 | 830 | 610 | 525 | 500 | 500 | 30 | 1,890 | 2,680 | 68 |
| D | 55 | | 1,580 | 3,040 | 3,140 | 3,300 | | 800 | 700 | 605 | 575 | 45 | 2,120 | 2,050 | 65 |

[1] (Large rotor.)

*Example 2*

The following example illustrates the advantage had from the present invention in preparation of rubbers for cold climates and the differences obtainable by selecting plasticizers and amounts thereof. Rubber compounds were prepared with the plasticizers shown in the following Table 3. The following formula in which parts as always herein are by weight was used in valuating the polymer:

FORMULA

| | Parts |
|---|---|
| Rubber | 100 |
| Philblack O | 75 |
| Stearic acid | 2 |
| Zinc oxide | 5 |
| Sulfur | 2 |
| Santocure | 1 |
| Softener or oil | Indicated in Table 3 | mineral oils mentioned, still better Gehman values are obtained in stocks having desirable properties. The present invention is therefore highly satisfactory for the production of articles used in arctic regions.

TABLE 3

[Gehman Data Relating Angular Twist to Temperature]

| Pts. Oil Used | 75° F. | 65° F. | 55° F. | 45° F. | 35° F. | 25° F. |
|---|---|---|---|---|---|---|
| 60 Sundex 53 (A dark lubricating oil extract as above described) | | | 1 | 2 | 78 | 150 |
| 60 Circosol 2XH (a viscous hydrocarbon liquid as above described) | | | 10 | 28 | 109 | 160 |
| 60 Sovaloid C (synthetic substantially entirely aromatic hydrocarbon oil dry from petroleum as above described, Cardolite 265, ethyl ether of Cardinol as above described) | | | 2 | 89 | 142 | |
| 60 Cardolite 625 | | 5 | 23 | 65 | 154 | |
| 60 Dioctyl Phthlate | | | 5 | 33 | 90 | 145 |
| 80 Diamond Process Oil (liquid petroleum distillate as above described) | 1 | 14 | 100 | 144 | 154 | 157 |
| 50 Circle Light Oil (liquid petroleum distillate as above described) | | | 3 | 68 | 116 | 133 |
| 32 Sundex 53 | | | | | | |
| 40 Circle Light Oil | | 2 | 3 | 36 | 135 | 148 |
| GR-S (5 pts. Paraflux (a saturated polymerized hydrocarbon liquid having a Saybolt viscosity at 100° C. of 77 seconds and having a specific gravity of 1.03)) | | | 2 | 20 | 97 | 125 |

*Example 3*

Several polymers were made by polymerizing styrene and butadiene in the ratio of 72 parts of butadiene to 28 parts of styrene at 41° F. utilizing standard cold rubber recipes, the amount of modifier MTM mercaptan necessary to obtain computed Mooneys, 51, 63, 85, 95, 104, 124, 162, 205 and 245 at 72% conversion was used. These polymers were compounded in accordance with the procedure above described for the evaluation of polymers, the parts of oil and black indicated in the following table. Each of the compounds was cured for 15, 30, 45, 60 and 75 minutes respectively. The optimum cure was selected and the S value calculated in accordance with the following formula:

$$S = T\left(\frac{E+100}{100}\right)$$

Figure 3:
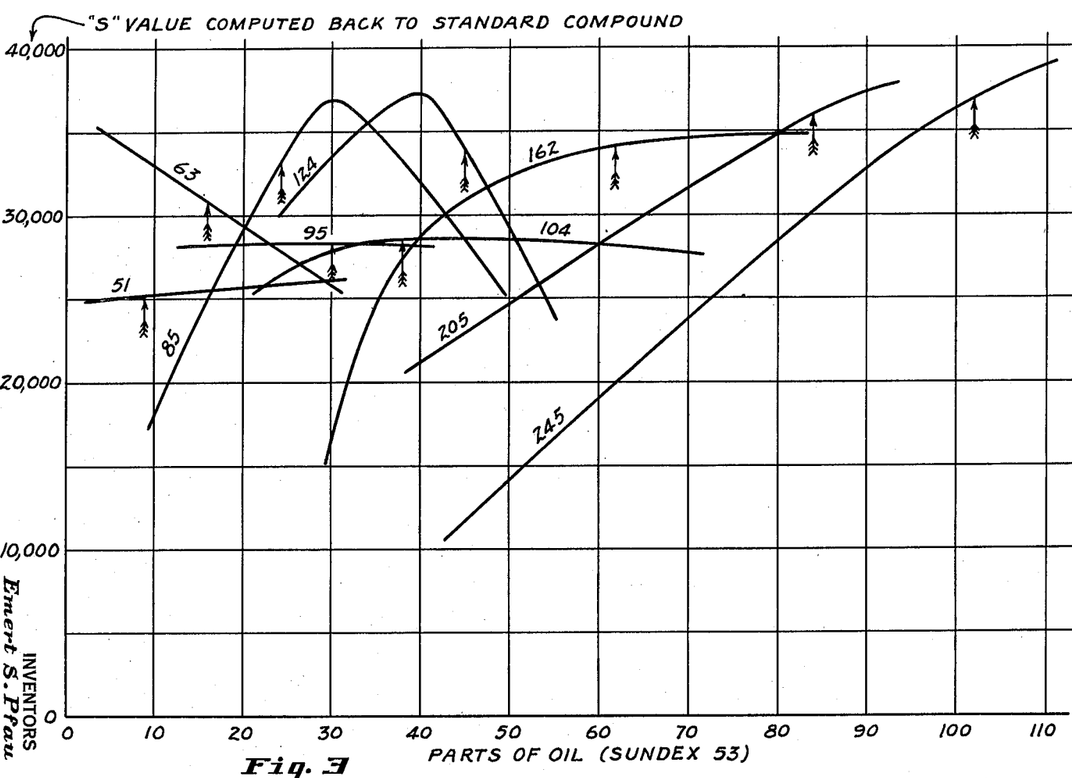
Fig. 3 is a graph in which modified "tensile product" value of various compounded polymers are plotted against their oil content to indicate the effect of the oil on certain physical properties of the compounds.

T is the tensile strength measured and E is the elongation. The S value is described in an article by Dr. Samuel Maron et al., appearing in Industrial Engineering Chemistry, volume 40, page 2220 (1948), as being more satisfactory than even "tensile product" for evaluating polymers as it takes into account the reduction in cross section at break due to elongation. The S value at optimum cure and the S value calculated back to a standard compound of 100 parts of polymer, 50 parts of black and 5 parts of oil is shown in the following Table 4, together with the parts of modifier oil and black used in preparing tread compound. S value vs. parts of oil (Sundex 53) used for each polymer is shown in Figure 3. An arrow placed on each of the curves indicates the point where 60 Mooney is obtained in the compound. It will be seen that the polymers of about 85 or 90 Mooney and above have inherently much superior properties when mixed with more than 25 parts of oil and these properties are maintained when enough oil is present during the mastication.

TABLE 4

| Polymer | Computed Mooney of Polymer | Parts oil added (per 100 rubber) | Parts Black | "S" Value for Optimum Cure | Calculated "S" Value (Based on 100 Rubber, 50 Black and 50 Oil |
|---|---|---|---|---|---|
| A | 51 | 5 | 50 | 25,000 | 25,000 |
| A | 51 | 30 | 67.5 | 20,000 | 26,000 |
| B | 63 | 5 | 50 | 34,800 | 34,800 |
| B | 63 | 30 | 65 | 20,800 | 25,800 |
| C | 85 | 10 | 55 | 17,100 | 18,750 |
| C | 85 | 20 | 60 | 21,600 | 25,600 |
| C | 85 | 30 | 65 | 29,000 | 37,400 |
| C | 85 | 50 | 75 | 17,400 | 26,000 |
| D | 95 | 15 | 57.5 | 25,200 | 28,900 |
| D | 95 | 30 | 65 | 21,800 | 27,300 |
| D | 95 | 40 | 72 | 20,600 | 28,800 |
| E | 104 | 25 | 62.5 | 21,000 | 26,000 |
| E | 104 | 35 | 67.5 | 20,900 | 28,300 |
| E | 104 | 50 | 75.0 | 18,700 | 27,700 |
| E | 104 | 70 | 85.0 | 16,700 | 28,000 |
| F | 124 | 25 | 62.5 | 25,000 | 31,000 |
| F | 124 | 40 | 70 | 27,200 | 37,000 |
| F | 124 | 55 | 77.5 | 15,900 | 24,300 |
| G | 162 | 30 | 65 | 12,900 | 16,600 |
| G | 162 | 45 | 72.5 | 24,200 | 34,700 |
| G | 162 | 60 | 80 | 19,400 | 30,600 |
| G | 162 | 80 | 90 | 19,700 | 35,000 |
| H | 205 | 40 | 70 | 15,300 | 21,200 |
| H | 205 | 70 | 85 | 18,600 | 31,200 |
| H | 205 | 80 | 90 | 19,700 | 35,000 |
| H | 205 | 90 | 95 | 18,100 | 33,900 |
| I | 226 | 45 | 72.5 | 8,050 | 11,650 |
| I | 226 | 75 | 87.5 | 15,000 | 25,900 |
| I | 226 | 90 | 95.0 | 17,000 | 33,200 |
| I | 226 | 110 | 105 | 18,900 | 39,000 |

*Example 4*

1000 lbs. of a polymer was made by polymerizing 72% butadiene and 28% styrene to 72% conversion at 41° F. using a potassium soap approved by the Rubber Reserve Corporation designated by the trade name a potassium stearate meeting specifications of the office of the Rubber Reserve Corporation as K-ORR as the emulsifying agent in the amount of 5%. The polymer thus produced had a computed Mooney of 195.

The latex of the polymer thus prepared was mixed with an emulsion of oil "Sundex 53" and a dispersion of carbon black. The "Sundex 53" emulsion was made by using 100 parts of "Sundex 53," 2 parts of oleic acid and 2 parts of ammonium hydroxide. The "Philblack O" slurry was made with 100 parts Philblack O and 4 parts Indulin A (lignin), 0.6 part sodium hydroxide and water to give a 15-16% total solids content in the slurry.

The latex and slurry and emulsion were mixed together in an amount sufficient to provide 55 parts of "Sundex 53" and 75 parts of "Philblack O" per each 100 parts of latex. The mixture was coagulated with salt and acid to obtain a crumb which was dried and sheeted out in slabs on an 84" mill. The further compounding and mixing were carried out in a #11 Banbury. It was compounded in accordance with the following formula:

| | Parts |
|---|---|
| (Masterbatch) | 230.5 |
| Sundex 53 | 5.0 |
| Philblack O | 10.0 |
| ZnO | 5.0 |
| Stearic | 1.0 |
| Santocure | 1.25 |
| B.L.E. | 1.0 |
| Sulfur | 2.0 |

The stock thus prepared when attempts were made to process in the factory was somewhat too stiff for best results and had a compounded four minute Mooney of 70.

The material was extruded in the form of tire treads and applied to identical 7.60 x 15 tire carcasses which were tested against two standard synthetic rubber controls. The results of the tire test are as follows:

[Tire test (7.60 x 15)—Miles/0.001 of tread]

| Miles | (control) GRS | | 195 Mooney Polymer | | Tread Rating, Percent |
|---|---|---|---|---|---|
| 4,200 | 35.6 | 37.8 | 42.4 | 53.2 | 129 |
| 8,400 | 36.5 | 38.0 | 41.1 | 44.7 | 118 |
| 10,500 | 34.5 | 37.8 | 41.3 | 43.9 | 118 |
| 12,600 | 37.7 | 38.9 | 42.0 | 45.3 | 114 |
| 14,700 | 42.1 | 42.7 | 44.0 | 46.1 | 106 |

The tires were 7.60 x 15. The miles per 0.001" of tread wear are indicated in the above table, as well as the comparative tread rating of the tires for the high Mooney polymer relative to the control.

*Example 5*

A polymer of butadiene and styrene containing 72 parts of butadiene and 28 parts of styrene was polymerized at 41° F. in the presence of 0.12 part of MTM (a trade name for a mixture of tertiary mercaptans consisting of tertiary mercaptans of 12, 14, and 16 carbon atoms, having about 60% of the 12 carbon atoms and 20% each of 14 and 16 carbon atom mercaptans). The conversion was 72% and the "computed Mooney" of the resultant polymer was 120.

A second polymer of identical butadiene and styrene content was polymerized under the same conditions except that the mercaptan content was reduced to .05 part of the MTM mercaptan. The "computed Mooney" of the resultant polymer was 175.

The latices from each of these polymers were separately coagulated and dried to give a fine crumb of dry polymer. The separate crumbs obtained were compounded in the tire tread compositions in accordance with the following table:

TABLE 5

| | 9333B (Control) | 9344A | 9346A |
|---|---|---|---|
| Cold Rubber Masterbatch (100R-50B) | 150 | | |
| Cold Rubber Masterbatch 120 Mooney Polymer | | 100 | |
| Cold Rubber Masterbatch 175 Mooney Polymer | | | 100 |
| P.O. (Philblack-O) | | 75 | 85 |
| Sundex 53 | | 35 | 60 |
| ZnO | 3.0 | 3 | 3 |
| Stearic | 3.0 | 1 | 1 |
| M.R. (mineral rubber) | 8.0 | | |
| Paraflux | 5.0 | | |
| (0.8 Santo.) Acc. Master | | | 4 |
| (0.9 Santo.) Acc. Master | | 4.5 | |
| Santocure | 1.4 | | |
| BLE | 0.8 | 0.8 | 0.8 |
| Stabilite | 0.8 | 0.8 | 0.8 |
| Sulfur | 1.8 | 2.0 | 2.5 |
| Total | 173.8 | 222.1 | 257.1 |

A standard cold rubber compound was used as a control. The formula for such standard compound is also shown in Table 5.

In preparing the compounds the polymer in crumb form was added to the Banbury and allowed two minutes time to break the crumb into a finely divided form. The oil was thereupon added and about three minutes later the carbon black was added. When the batch temperature rose to 350° F. the batch was dropped. The accelerator, antioxidant and other materials were mixed into the rubber the following day by means of another pass through the Banbury. The compounds thus produced were extruded through the orifice of a tubular machine into tire treads of similar shape and size to prepare 7.60 x 15 tires.

The physical characteristics of the compound were obtained by curing samples of each thereof for the times indicated in the following table:

TABLE 6

|  | Cure Time, minutes | 9333B— x 556 | 9344A— Blend 2 | 9346A— Blend 3 |
|---|---|---|---|---|
| Cure 287° F.: |  |  |  |  |
| 300% Mod | 15 | ---- | 200 | 285 |
|  | 30 | 635 | 1,185 | 960 |
|  | 45 | 790 | 1,480 | 1,360 |
|  | 60 | 1,075 | 1,725 | 1,600 |
|  | 90 | 1,145 | 1,725 | 1,785 |
| Tensile | 15 | ---- | 725 | 1,305 |
|  | 30 | 2,760 | 2,930 | 2,340 |
|  | 45 | 2,930 | 3,170 | 2,380 |
|  | 60 | 3,130 | 3,280 | 2,700 |
|  | 90 | 2,810 | 3,030 | 2,760 |
| Elongation | 15 | ---- | 815 | 760 |
|  | 30 | 765 | 550 | 515 |
|  | 45 | 690 | 510 | 415 |
|  | 60 | 620 | 490 | 420 |
|  | 90 | 580 | 440 | 430 |
| Hardness | 15 | ---- | 50 | 42 |
|  | 30 | 60 | 56 | 55 |
|  | 45 | 63 | 61 | 56 |
|  | 60 | 66 | 61 | 57 |
| Rebound | 75 | 66 | 61 | 58 |
|  | 60 | 56 | 57 | 57 |

The rubber stock prepared from the cold rubber masterbatch had a Mooney plasticity of 62 after extrusion, the Mooney plasticity of the stock produced from the 120 polymer was 74 after extrusion, and the Mooney plasticity of the compound prepared from the 175 Mooney polymer was 63 after extrusion, all plasticities being measured with the large rotor at four minutes.

Tires having treads applied on identical standard carcasses were made with each of the aforementioned treads. The tires were tested on a test fleet in the ordinary manner in the summer in California. The tread wear data is shown in the following table:

TABLE 7

[Tire test 2845 (7.60 x 15)]

| Tire No. | Miles | Miles/ 0.001 tread | Rating, percent |
|---|---|---|---|
| Cold Rubber Control, 9333B | 8,400 | 48.6 | 100 |
|  | 16,800 | 50.3 | 100 |
|  | 18,890 | smooth | ---- |
| 120 Mooney Polymer, 9344A | 8,400 | 62.7 | 129 |
|  | 16,800 | 66.9 | 133 |
|  | 18,890 | 64.5 | ---- |
| 175 Mooney Polymer, 9346A | 8,400 | 60.9 | 125 |
|  | 16,800 | 62.9 | 125 |
|  | 18,890 | 60.8 | ---- |
| 175 Mooney Polymer, 9346A | 8,400 | 61.3 | 127 |
|  | 16,800 | 63.2 | 127 |

*Example 6*

In order to show the advantage of high Mooney rubber oil mixtures when mixed with lower Mooney polymers such as standard GR-S (Government reserve synthetic rubber) tires were prepared utilizing only 20% based on rubber of the high Mooney polymers in the compounds from which the treads were formed. The specific compounds are shown in the following table:

TABLE 8

|  | A | B |
|---|---|---|
| Polymer A | 20 | ---- |
| Polymer B | ---- | 20 |
| GR-S—Black Masterbatch, (50 Philblack-O— 100 GR-S) | 120 | 120 |
| Sundex 53 | 16 | 12 |
| Philblack-O | 17 | 15 |
| BLE | .8 | .8 |
| Stabilite | .8 | .8 |
| Zinc Oxide | 3.0 | 3.0 |
| Santocure | 1.0 | .9 |
| Sulfur | 1.9 | 1.9 |
|  | 180.5 | 174.4 |

In making the mixtures the amounts of GR-S black masterbatch of polymer A and polymer B indicated in the above table were placed in a Banbury mixer and blended together for two minutes, whereupon the oil indicated in the table and black indicated in the table was added. The mixing was continued for four minutes and the remaining ingredients added. The sulfur and accelerator were added on a second pass through the Banbury. The total mixing time was nine minutes. The amount of oil used was that required for the high Mooney polymer plus the oil required to obtain a 60 to 70 compound Mooney.

Compounds thus obtained were extruded into tire treads and applied to standard tire carcasses, each having a plurality of plies extending from bead to bead and intermediate layers of rubber.

The tread wear rating of the various tires after 12,600 miles on a test car relative to a standard 100% GR-S control is shown in the following table:

TABLE 9

[Tire test data—(7.50 x 15)]

Relative treadwear rating
20% polymer A (195 computed Mooney) ________ 104
20% polymer B (120 computed Mooney) ________ 112
GR-S control (50 Philblack-O) ________ 100

The preceding example shows that some advantage may be obtained with even relatively small amounts of polymer in admixture in an ordinary easy processing rubber. It should be emphasized the main advantage and economies of the present invention are minimized by the small proportion of the high Mooney rubber mixture used.

While we have emphasized in the preceding examples the formation of tire treads the high Mooney rubber mixtures are also applicable to the production of tire carcass stocks which have an advantage not only in economy but in that they are more efficient and develop less heat upon flexing at elevated temperatures than the stocks made from the usual synthetic rubbers. An example of a suitable carcass compound is as follows:

*Example 7*

| | |
|---|---|
| Polymer 120 ML-4 | 100 |
| Sundex 53 | 30 |
| Philblack A | 50 |
| "Koresin" (reaction product of P tertiary butyl phenol and acetylene) | 10 |
| B.L.E. | 1 |
| Zinc oxide | 3 |
| Sulfur | 2 |
| Altax | 1.2 |
| Monex | 0.3 |

The above compound is mixed the same way as is the tread compound in the preceding examples. The carbon black used is a high modulus furnace black. No difficulty is had as in GR-S with incorporating the required amount of Koresin to obtain tackiness. The compounded Mooney of the stock is less than 60 and is suitable for application to suitable rayon cord fabric. Tire carcasses constructed in the ordinary manner except that the above compound may be used with treads of various compositions.

The high Mooney oil mixtures of the present invention may also be combined with natural rubber to produce compounds also suitable for the preparation of tire carcasses. The following example in which parts are also by weight illustrates such compound:

*Example 8*

| | |
|---|---|
| Polymer 120 ML-4 | 66.6 |
| Natural rubber | 33.3 |
| Sundex 53 | 20 |
| Philblack A | 50 |
| B.L.E. | 1 |
| Zinc Oxide | 5 |
| Sulfur | 2.25 |
| Altax (accelerator) | 1.0 |
| Monex (accelerator) | 0.2 |
| Stearic Acid | 2 |

(Altax is benzothiozole disulfide; Monex is tetramethylthiuram monosulfide.)

In mixing the above the oil is mixed with the 120 Mooney polymer and after it is absorbed, this polymer is mixed with the natural rubber and the B.L.E. The black is then added and the mixing continued until the materials go together. The additional ingredients are added in a separate mix. The compound in the preceding example is used in the construction of tire carcasses.

*Example 9*

A flame resistant rubber is prepared by polymerizing a mixture of 70 parts of butadiene and 30 parts of methylisopropenyl ketone in emulsion the substantial absence of modifier to produce a polymer having a computed Mooney of 200.

The polymer is compounded according to the following formula:

| | Parts |
|---|---|
| 200 Mooney BD/MIK (70/30) | 100 |
| Tricresyl phosphate | 70–80 |
| Hysil (a finely divided silica having a particle size of about 30 milomicrons) | 90 |
| Sulfur | 3 |
| Altax | 1.5 |
| Tuads (tetramethylthiuram disulfide) | 0.3 |
| ZnO | 5.0 |
| Stearic | 2.0 |

In the examples herein the plasticizer particularly mentioned may be substituted in whole or in part by other plasticizer mentioned. It is again emphasized that the plasticizers are not equivalent for all purposes. The hydrocarbon and general purpose high Mooney synthetic rubbers are most compatible with the hydrocarbon oils, mineral rubber, and plasticizer mixtures comprising hydrocarbon plasticizers particularly when they have an aromatic content.

The present invention affects great economies in the amount of synthetic rubbers utilized. It is largely possible because of the difference in character between synthetic rubbers and natural rubber, the different breakdown characteristics and the toughness of character inherent in the polymer.

It is also apparent that modifications of the invention may be made without changing the spirit thereof, and it is intended that the invention be limited only by the appended claims.

What we claim is:

1. A pneumatic tire having a tread portion comprising a vulcanized synthetic rubber compound containing a non-oil-resistant rubbery polymerization product of a conjugated diolefinic compound having not in excess of 8 carbon atoms, said polymerization product being compatible with hydrocarbon mineral oils and of a toughness such that a composition composed of 100 parts by weight of said polymerization product, 30 parts of a hydrocarbon oil and 65 parts of a high abrasion furnace carbon black will have a Mooney plasticity of at least 60, said rubber compound containing 20 to 100 parts of a compatible plasticizer based on the weight of said polymerization product in said compound.

2. The pneumatic tire set forth in claim 1 in which the compatible plasticizer is an oil and in which the said tread portion contains 30 to 100 parts of said oil based on the weight of said polymerization product in said compound.

3. The pneumatic tire set forth in claim 2 in which said tread portion contains 30% to 80%, by weight, of a reinforcing carbon black pigment based on the total weight of said polymerization product and oil.

4. The pneumatic tire set forth in claim 3 in which the said polymerization product of said toughness constitutes the major portion of all solid polymers of diolefinic compounds that may be present in said vulcanized rubber compound.

5. The tire set forth in claim 1 in which the polymerization product is a hydrocarbon polymerization product of a conjugated diolefin, in which the plasticizer is substantially hydrocarbon oil having a boiling point above 450° F. and is present in amounts of 35 to 100 percent based on the weight of said polymerization product and in which the tread portion contains 35 to 65 percent of carbon black based on the total weight of said polymerization product and plasticizer.

6. The tire set forth in claim 1 in which the said polymerization product is a copolymer of butadiene and a copolymerizable aryl olefinic compound and in which said copolymer constitutes the major proportion of all of the solid polymers of diolefinic compounds that may be present in said vulcanized rubber compound.

7. The tire set forth in claim 1 in which the rubber compound comprises a hydrocarbon copolymer of a conjugated diolefin with a copolymerizable mono-olefinc compound, said polymer being one polymerized at less than 60° F. to provide a relatively long chain molecular structure and in which said plasticizer is an oily hydrocarbon.

8. The tire set forth in claim 1 in which said polymerization product is a copolymer of butadiene and styrene, in which the Mooney plasticity of said polymerization product in the raw state is at least 120 and in which the amount of oily plasticizer is more than 35 parts by weight per 100 parts by weight of said polymerization product.

9. The tire set forth in claim 1 in which the plasticizer is largely a hydrocarbon oil, in which the total amount of plasticizer present is at least 45 parts per 100 parts by weight of the polymerization product in the compound, and in which said polymerization product is of a toughness such that a composition composed of 100 parts by weight of said polymerization product, 60 parts of a hydrocarbon oil and 80 parts of a high abrasion carbon black will have a Mooney plasticity of at least 60.

10. The pneumatic tire set forth in claim 1 in which the major portion of the synthetic rubber in said rubber compound has a Mooney plasticity of at least 135 and in which the plasticizer is a petroleum oil having a boiling point of at least 450° F. and is present in amounts of at least 35 percent by weight of the amount of said synthetic rubber having a Mooney plasticity of at least 135.

11. The pneumatic tire set forth in claim 1 wherein a substantial proportion of the polymerization product of said diolefinic compound is a copolymer polymerized in aqueous emulsion at a temperature below 60° F. and is characterized by being substantially gel free, and the amount of oily plasticizer present in the compound is at least 35 percent based on the weight of the relatively tough diolefinic compound present.

12. A pneumatic tire having a tread portion that comprises a molded and vulcanized rubber compound containing a non-oil-resistant rubbery synthetic polymerization product of a conjugated diolefinic compound having not in excess of 8 carbon atoms, said polymerization product being compatible with hydrocarbon mineral oils and having a Mooney plasticity of at least 115, a hydrocarbon oil in the amount of at least 40 percent of the weight of said polymerization product, said oil having a boiling point of at least 450° F., and carbon black in an amount of from 30 to 80 percent of the weight of the polymerization product and oil, the major portion of the carbon black being a high abrasion furnace black.

13. A curable rubber tread stock the principal ingredients of which are an aliphatic hydrocarbon compatible synthetic hydrocarbon polymer of a conjugated diolefinic compound of less than 8 carbon atoms, 20 to 100 parts of a compatible plasticizer to 100 parts by weight of said polymer and a high abrasion furnace black in an amount of at least 35% by weight of the combined polymer and plasticizer, said polymer having a Mooney viscosity of at least 100 prior to compounding with said plasticizer and the proportion of plasticizer and carbon black in the composition being that required to produce a tread stock having a Mooney viscosity of from 30 to 70.

14. A curable rubber tire tread stock comprising essentially a hydrocarbon-oil-compatible, rubbery, synthetic hydrocarbon polymerization product of a conjugated diolefinic compound having not in excess of 8 carbon atoms, which compound has a raw Mooney plasticity of at least 90 (ML-4), a reinforcing carbon black pigment, and at least 30 parts by weight of a compatible plasticizer per 100 parts of said polymerization product, said rubber tread stock containing from 30 to 80 parts by weight of said reinforcing pigment per 100 parts by weight of the combined amount of said polymerization product and said plasticizer present, and said tread stock having a Mooney plasticity (ML-4) not appreciably in excess of 80 and not substantially less than 40.

15. A curable rubber tire tread stock comprising essentially a hydrocarbon-oil-compatible, rubbery, synthetic hydrocarbon polymerization product of a conjugated diolefinic compound having not in excess of 8 carbon atoms, which has a raw Mooney plasticity of at least 90 (ML-4), a reinforcing carbon black pigment, and a compatible oily plasticizer, there being from 30 to 100 parts by weight of said oily plasticizer to 100 parts by weight of said polymer and from 30% to 80%, by weight of said carbon black, based on the combined weight of said polymer and said plasticizer present, and said tread stock having a Mooney plasticity (ML-4) not appreciably in excess of 80 and not substantially less than 40.

16. The curable rubber tire tread stock of claim 15 in which the polymerization product is a copolymer of a major amount of said conjugated diolefin compound and a minor amount of at least one copolymerizable monoolefinic compound.

17. The curable rubber tire tread stock of claim 16 in which said copolymer constitutes the major portion of all of the solid polymers of diolefinic compounds which may be present in said tread stock.

18. A curable rubber tire tread stock comprising essentially a hydrocarbon-oil-compatible rubbery synthetic hydrocarbon polymerization product of a conjugated diolefin having not in excess of 8 carbon atoms, a fine, reinforcing, high abrasion carbon black and at least 30 parts by weight of a compatible mineral oil per 100 parts of said polymerization product, said rubber tread stock containing from 30 to 80 parts by weight of said carbon black per 100 parts of the combined amount of said polymerization product and said mineral oil present, said polymerization product being in a substantially non-broken down state and having a raw Mooney plasticity of at least 90 (ML-4), and said tread stock having a Mooney plasticity (ML-4) not appreciably in excess of 80 and not substantially less than 40.

19. A curable rubber tire tread stock comprising essentially a hydrocarbon-oil-compatible rubbery synthetic hydrocarbon polymerization product of a conjugated diolefin having not in excess of 8 carbon atoms, a fine, reinforcing, high abrasion carbon black and at least 30 parts by weight of a compatible softening oil per 100 parts by weight of said polymerization product, said rubber tread stock containing from 30 to 80 parts by weight of said carbon black per 100 parts by weight of the combined amount of said polymerization product and said softening oil present, said polymerization product being in a substantially unmasticated state and having a raw Mooney plasticity of at least 90 (ML-4), and said tread stock having a Mooney plasticity (ML-4) not appreciably in excess of 80 and not substantially less than 40.

20. A curable rubber tire tread stock comprising essentially a hydrocarbon-oil-compatible rubbery synthetic hydrocarbon copolymer of a major amount of conjugated diolefinic compound having not in excess of 8 carbon atoms and a minor amount of at least one copolymerizable monoolefinic compound, a fine, reinforcing, high abrasion carbon black and at least 30 parts by weight of a compatible softening oil per 100 parts by weight of said copolymer, said rubber tread stock containing from 30 to 80 parts by weight of said carbon black per 100 parts by weight of the combined amount of said copolymer and said softening oil present, said copolymer being in a substantially non-broken down state and having a raw Mooney plasticity of at least 115 (ML-4), and said tread stock having a Mooney plasticity (ML-4) not appreciably in excess of 80 and not substantially less than 40.

21. The curable rubber tire tread stock of claim 20 in which said polymerization product having a raw Mooney plasticity of at least 115 (ML-4) constitutes the major portion of all of the solid polymers of diolefinic compounds which may be present in said tread stock.

22. A curable rubber tire tread stock comprising essentially a polymerization product which comprises a copolymer of a major amount of butadiene and a minor amount of styrene, a fine, reinforcing, high abrasion carbon black and at least 30 parts by weight of a compatible softening oil per 100 parts of said polymerization product, said rubber tread stock containing from 30 to 80 parts by weight of said carbon black per 100 parts by weight of the combined amount of said polymerization product and said softening oil present, said polymerization product being in a substantially non-broken down state and having a raw Mooney plasticity of at least 115 (ML-4), and said tread stock having a Mooney plasticity (ML-4) not appreciably in excess of 80 and not substantially less than 40.

References Cited in the file of this patent

UNITED STATES PATENTS

| | | |
|---|---|---|
| 2,009,599 | Woock | July 30, 1935 |
| 2,217,918 | Rostler et al. | Oct. 15, 1940 |
| 2,419,512 | Vesce | Apr. 22, 1947 |
| 2,449,928 | Corkery | Sept. 21, 1948 |
| 2,466,027 | Horney et al. | Apr. 5, 1949 |
| 2,476,884 | Maynard | July 19, 1949 |
| 2,497,226 | McNeill | Feb. 14, 1950 |
| 2,575,249 | Connell et al. | Nov. 13, 1951 |
| 2,576,968 | Pike et al. | Dec. 4, 1951 |
| 2,615,009 | St. John et al. | Oct. 21, 1952 |
| 2,649,425 | Hulse | Aug. 18, 1953 |

FOREIGN PATENTS

| | | |
|---|---|---|
| 123,533 | Australia | Feb. 20, 1947 |

(Other references on following page)

OTHER REFERENCES

"Softener Study 2A," Hycar Rubber Co., Akron, Ohio, pages 6–11, September 1942.

Juve: "India Rubber World, volume 110, No. 1, April 1944, pages 51 to 54.

Rongone et al.: "The Rubber Age," volume 55, No. 6, pages 577 to 582, September 1944.

O'Connor et al.: "Rubber Age," volume 54, No. 5, February 1944, pages 423–427.

Grote et al.: "Rubber Age," September 6, 1945, volume 57, No. 6, pages 685–690.

Rostler: "Rubber Age," volume 69, No. 5, August 1951, pages 563 and 564.

Gee: "India Rubber Journal," Dec. 6, 1952, pages 960 and 961.

Shearon et al.: "Ind. & Eng. Chem.," volume 40, No. 5, pages 769–777, May 1948.

Howland et al.: "Rubber Age," volume 64, No. 4, pages 459 to 481, January 1949.

Smith et al.: "Ind. & Eng. Chem.," volume 41, No. 8, pages 1584 to 1587, August 1949.

Whitby et al.: "Synthetic Rubber," Wiley, 1954, pages 213–219, 399–403.

Morton: "Ind. & Eng. Chem.," volume 42, pages 1488–1496, August 1950.

D'Ianni: "Ind. & Eng. Chem.," volume 42, pages 95–102, January 1950.

Duismore: "Rubber Chemistry and Technology," January–March 1953, pages 25–56.

UNITED STATES PATENT OFFICE
CERTIFICATE OF CORRECTION

Patent No. 2,964,083

December 13, 1960

Emert S. Pfau et al.

It is hereby certified that error appears in the printed specification of the above numbered patent requiring correction and that the said Letters Patent should read as corrected below.

Column 1, line 18, for "types" read -- tires --; column 3, line 44, for "Figurue" read -- Figure --; columns 9 and 10, TABLE 1, first column thereof, line 17, for "Circosol 2X" read -- Circosol 2XH --; column 13, lines 36 and 37, for "copreciated" read -- coprecipitated --; column 14, line 14, for "compounded" read -- computed --; line 53, for "as", second occurrence, read -- and --; columns 15 and 16, Table 3, in the headings of columns 2 through 7 thereof, for "75° F., 65° F., 45° F., 45° F., 35° F., and 25° F." read -- -75° F. -65° F. -55° F. -45° F. -35° F. -25° F. --; column 17, line 59, after "name" insert -- K-ORR --; line 61, strike out "the", first occurrence; same line 61, strike out "as K-ORR"; column 18, line 10, for "Stearic" read -- Stearic Acid --; line 68, Table 5, first column thereof, for "Stearic" read -- Stearic Acid --; column 21, line 49, for "Stearic" read -- Stearic Acid --; line 60, for "affects" read -- effects --; column 26, line 13, list of references cited, under "OTHER REFERENCES", for "Duismore" read -- Dinsmore --.

Signed and sealed this 18th day of April 1961.

(SEAL)
Attest:

ERNEST W. SWIDER
Attesting Officer

DAVID L. LADD
Commissioner of Patents

UNITED STATES PATENT OFFICE
CERTIFICATE OF CORRECTION

Patent No. 2,964,083                          December 13, 1960

Emert S. Pfau et al.

It is hereby certified that error appears in the above numbered patent requiring correction and that the said Letters Patent should read as corrected below.

Column 23, line 33, for "compound" read -- product --.

Signed and sealed this 29th day of June 1965.

(SEAL)
Attest:

ERNEST W. SWIDER                                EDWARD J. BRENNER
Attesting Officer                                       Commissioner of Patents